United States Patent Office 3,672,827
Patented June 27, 1972

3,672,827
SODIUM PHOSPHATE RECOVERY PROCESS
Duane L. Sawhill, Orange, Conn., assignor to
Olin Corporation
No Drawing. Filed Dec. 14, 1970, Ser. No. 98,134
Int. Cl. C01b 25/30
U.S. Cl. 23—107                                5 Claims

ABSTRACT OF THE DISCLOSURE

Soluble phosphate values are recovered from the by-product insoluble phosphates precipitated when wet process phosphoric acid is partially neutralized in the manufacture of sodium phosphate. A mixture of soda ash with the insoluble phosphates is calcined and the soluble phosphates are leached out. The extract is purified to remove aluminum and fluorides. Suitably the purified extract is recycled to the sodium phosphate producing process or used for the recovery of solid sodium phosphates.

---

This invention relates to improvements in the manufacture of sodium phosphates from wet process phosphoric acid whereby low grade by-product insoluble phosphates are treated to recover the $P_2O_5$ values contained therein as usable soluble phosphates.

In the manufacture of wet process phosphoric acid, phosphate rock or other phosphate ores are digested with sulfuric acid, calcium sulfate is precipitated and removed together with unreacted rock and aqueous wet process phosphoric acid is produced. In preparing pure sodium phosphates from wet process phosphoric acid, the acid is first neutralized to a pH of about 2 to 5 by the addition of soda ash, caustic soda or other alkalies. At this point, by-product insoluble phosphates precipitate and are separated. They may amount up to 12 percent of the $P_2O_5$ charged to the phosphoric acid process. The liquor is further processed in known manner to produce monosodium phosphate, disodium phosphate, trisodium phosphate, sodium tripolyphosphate and other sodium phosphates.

The by-product insoluble phosphates are completely citrate soluble and are usually blended with other phosphate fertilizer materials in order to dispose of this low grade by-product or discarded when it cannot be sold. Water-soluble sodium phosphates are recovered by the process of this invention from the insoluble phosphates enhancing the value of these phosphates. Unconverted insoluble phosphates are disposable as fertilizer materials and none of the phosphate values are degraded.

According to the present invention, phosphate values are recovered in the form of sodium phosphates by treating the by-product insoluble phosphates by the steps of:

(a) Mixing soda ash with said insoluble phosphates in a weight ratio of 80 to 100 parts of soda ash per 100 parts of insoluble phosphate;

(b) Calcining the resulting mixture until the temperature of said mixture is from 500 to 850° C.;

(c) Leaching the resulting calcine with water at temperatures of 60 to 100° C. to extract water-soluble sodium phosphates from said calcine;

(d) Adding to said extract a water-soluble sodium silicate thereby precipitating dissolved aluminum and separating the resulting precipitate from said extract;

(e) Evaporating the resulting extract at temperatures from 70 to 120° C. thereby precipitating sodium fluoride and separating said precipitated sodium fluoride from the purified extract; and (f) Recovering sodium phosphates from said purified extract.

The by-product insoluble phosphates used according to this invention vary in composition depending on the composition of the phosphate rock and conditions of treatment but generally conforms to the analyses shown in Table I. Typical analysis of phosphate rock is also included in Table I for comparison.

The analyses in Table I show that the insoluble phosphates used as starting material for the process of the present invention are a very different material from phosphate rock and other phosphate ores. Phosphate rock is largely tricalcium phosphate, $Ca_3(PO_4)_2$ with minor amounts of $Fe_2O_3$ and $Al_2O_3$, present as phosphates. The insoluble phosphates in comparison are low in calcium and high in iron and aluminum phosphates. The rock is largely crystalline material while the insoluble phosphate is a finely divided colloidal, amorphous, clay-like material produced as a mud. In addition, the rock, to the extent it is soluble in water, is an alkaline material whereas the insoluble phosphate, suspended in water, shows a pH of about 5.

In the process of the present invention, the insoluble phosphates are mixed with soda ash, suitably in the ratio of about 80 to 100 parts by weight of $Na_2CO_3$ per 100 parts of insoluble phosphate on a dry basis. More soda ash does not improve recovery of soluble phosphate and less soda ash results in uneconomic recovery levels of the $P_2O_5$ in the insoluble phosphates. The soda ash used is suitably anhydrous, hydrated, dense or light ash.

TABLE I
Composition of Phosphate Materials

| | Percent by weight | | | |
|---|---|---|---|---|
| | | Insoluble phosphates | | |
| Component | Phosphate rock | Range | Typical | Residue |
| $P_2O_5$ | 30–35 | 38–44 | 43 | 17.90 |
| CaO | 35–50 | 10–16 | 11.3 | 23.60 |
| $Fe_2O_3$ | a1–4 | 8–14 | 11.1 | |
| $Fe_3O_4$ | | | | 15.90 |
| $Al_2O_3$ | a1–4 | 5–8 | 5.6 | 3.96 |
| MgO | 0.02–0.5 | 0.1–2 | 0.2 | 0.21 |
| $Na_2O$ | 0.1–0.6 | 6–12 | 10.7 | 4.68 |
| $SiO_2$ | 2–10 | | | |
| F | 3.5–4 | 3–4 | 3.4 | 0.73 |
| $H_2O$ (Free) | | 0.1–5 | 1.0 | |
| Loss on ignition | | 8–12 | 10.5 | |
| Balance | 1–10 | 1–10 | 18.1 | 33.02 |
| Total | 100 | 100 | 100 | 100 | a Combined $Fe_2O_3$ and $Al_2O_3$.

Advantageously, the soda ash is blended with a wet filter cake of insoluble phosphates obtained when they are filtered from the partially neutralized phosphoric acid. The wetter the cake, the more phosphates are recovered in purified form by the process of this invention. Alternatively, dry, ground insoluble phosphates are suitably mixed with soda ash, water being advantageously added in limited amounts but sufficient to promote thorough mixing. The mixture is suitably dried, if desired, as a separate step before calcining but such a separate drying step is usually unnecessary.

The mixture of ash and insoluble phosphates is calcined to raise its temperature suitably to 500 to 850° C. preferably about 600 to 700° C. Unless the temperature of the mixture reaches at least 500° C., the solubilization of the phosphate falls below economic recovery levels. Temperatures much above 700° C. do not seem to effect further increase in solubilization. At 880° C., the temperature of incipient fusion, the recovery of soluble phosphate drops materially.

The calcined mixture is suitably cooled and ground to facilitate extraction. Grinding to pass 100 mesh (U.S. Standard) screens is satisfactory and finer grinding leads to no better recovery.

The ground calcined mixture is extracted with water to separate the water-soluble sodium phosphates from the insoluble residue. Leaching the calcine with hot water, suitably from about 70 to 100° C., is preferred. Cold water increases caking problems and results in slower extraction. Continuous leaching with fresh, hot water, removing the extract continuously from the solid, improves recovery. Thorough extraction of the soluble phosphate requires at least about 10 parts by weight of water per part of calcine. Less water can be used but then extraction is incomplete. More water, for example, 30 to 50 parts or more per part of calcine is advantageous to obtain thorough extraction.

The aqueous sodium phosphate extract is substantially free from iron, calcium and magnesium but contains dissolved aluminum and fluoride. The solution is purified with respect to aluminum by adding sodium silicate preferably in substantially the stoichiometric amount, to precipitate the very insoluble analicite, having the formula $Na_2O \cdot Al_2O_3 \cdot 4SiO_2 \cdot 2H_2O$. The stoichiometric ratio is $Al:2SiO_2$. Any of the commercial soluble sodium silicates are suitable. Excess is preferably avoided to prevent silicate contamination of the extract. Advantageously, the silicate is added cold, well mixed with the warm extract and the mixture is allowed to stand to permit the flocculent precipitate to coalesce and settle. The insoluble analcite is separated from the solution by filtration or other suitable means and is discarded.

The aqueous sodium phosphate extract is purified with respect to fluoride by evaporating the solution at a temperature of 70° C. or higher. At lower temperatures, a slightly soluble double salt, $2Na_3PO_4 \cdot NaF \cdot 19H_2O$ separates and this is to be avoided as it represents loss of soluble sodium phosphate. At temperatures preferably from about 80 to 120° C., solid sodium fluoride is precipitated and is separated and removed from the solution. The evaporation is continued until a concentration of about 30 to 35 percent by weight of total solids (dissolved and suspended) is reached and substantially all of the fluoride has precipitated. The sodium fluoride is suitably washed and dried to produce salable product or it is processed to form hydrogen fluoride. The fluoride values are also suitably recovered in any other known manner.

The purified sodium phosphate solution is substantially free from iron, aluminum, calcium, magnesium and fluoride. It has a pH of about 12 and the atomic ratio of sodium to phosphorus is about 4:1. It is advantageously recycled to a sodium phosphate producing process and worked up to produce monosodium phosphate, disodium phosphate, trisodium phosphate, sodium tripolyphosphate or other sodium phosphates. Alternatively, it is neutralized with phosphoric acid and evaporated to produce trisodium phosphate or other simple sodium phosphate directly.

By the process of the present invention, about 80 percent of the $P_2O_5$ content of the insoluble phosphates is recovered as water-soluble sodium phosphates. About 65 percent of the sodium content of the insoluble phosphates is recovered as sodium phosphates. About 67 percent of the aluminum content of the insoluble phosphates is initially solubilized but later removed. All the calcium, iron and magnesium remain insoluble. The residual insoluble phosphates, amounting to about 50 percent of the charge, consist mainly of calcium carbonate, $Fe_3O_4$ and apatite, $Ca_5(PO_4)_3F$, and has the analysis shown in the right hand column of Table I.

EXAMPLE I

Ninety-four pounds of light soda ash was mixed in a blunger with 500 pounds of wet filter cake of insoluble phosphates precipitated by partially neutralizing wet process phosphoric acid to pH 5. The wet cake consisted of 400 pounds of water and 100 pounds of dry solids analyzing 43.0 percent of $P_2O_5$, 10.7 percent of $Na_2O$ and 3.4 percent of fluorine. The mixture of soda ash and filter cake was calcined in a muffle furnace for two hours until the temperature of the mixture was 700° C. driving off 435 pounds of water and other volatiles. The remaining 159 pounds of calcine was ground to pass 100 mesh U.S. Standard screens and leached by passing 4000 pounds of boiling water through the bed of calcine on a filter. The undissolved solids amounted to 48 pounds and contained 8.6 pounds of combined $P_2O_5$, 2.25 pounds of combined $Na_2O$ and 0.35 pound of combined fluorine. The leachings contained 34.4 pounds of combined $P_2O_5$, 63.45 pounds of combined $Na_2O$ and 3.05 pounds of combined fluorine.

The dissolved aluminum was removed from the soluble phosphate solution by adding 31.4 pounds of sodium silicate containing 9 pounds of $SiO_2$ and 2.8 pounds of $Na_2O$ (molar ratio 1.23:1) in 20 pounds of water and digesting at ambient temperature for one hour. The mixture was filtered to remove 14 pounds of analcite, $$Na_2O \cdot Al_2O_3 \cdot 4SiO_2 \cdot 2H_2O.$$

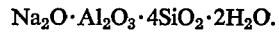

The filtrate having an atomic ratio of Na:F:P of 12.9:1.0:3.0 was pumped at 665 gallons per minute to a vacuum evaporator maintained at 85° C.

The effluent from the evaporator was reduced to a total solids content (dissolved and suspended) of 33 percent. It was filtered, recovering 6.7 pounds of solid sodium fluoride and a filtrate containing 34.4 pounds of recovered $P_2O_5$ and 63.95 pounds of recovered $Na_2O$. The filtrate was pumped as recycle to the sodium phosphate plant where it was combined with phosphoric acid to produce additional sodium phosphates.

What is claimed is:

1. In the process of manufacture of sodium phosphates wherein wet process phosphoric acid is partially neutralized to a pH of about 2 to 5, insoluble phosphates are precipitated and separated from the liquor and said liquor is further neutralized and processed to produce sodium phosphates, the improvement of:
    (a) mixing soda ash with said insoluble phosphates in a weight ratio of 80 to 100 parts of soda ash per 100 parts of insoluble phosphates;
    (b) calcining the resulting mixture until the temperature of said mixture is from 500 to 850° C.
    (c) leaching the resulting calcine with water at temperatures of 70 to 100° C. to extract water-soluble sodium phosphates from said calcine;
    (d) adding to said extract a water-soluble sodium silicate thereby precipitating dissolved aluminum and separating the resulting precipitate from said extract;
    (e) evaporating the resulting extract at temperatures from 70 to 120° C. thereby precipitating sodium fluoride and separating said precipitated sodium fluoride from the purified extract; and
    (f) recovering sodium phosphates from said purified extract.

2. Method as claimed in claim 1 in which the amount of water used in said leaching is at least 10 parts by weight per part of dry calcine.

3. Method as claimed in claim 1 in which the amount of said water-soluble sodium silicate is sufficient to provide substantially 2 moles of $SiO_2$ per atom of dissolved aluminum in said extract.

4. Method as claimed in claim 1 in which said evaporating is continued until the content of total solids is from 30 to 35 percent by weight.

5. Method as claimed in claim 1 in which said purified extract is recycled to the sodium phosphate producing process wherein said insoluble phosphates are produced.

References Cited

UNITED STATES PATENTS

| 2,220,790 | 11/1940 | McCullough | 23—106 |
| 2,221,356 | 11/1940 | Michels | 23—106 |
| 598,182 | 2/1898 | Poole | 23—107 |
| 1,487,205 | 3/1924 | Carothers et al. | 23—165 |

FOREIGN PATENTS

| 2,009,687 | 2/1970 | France | 23—107 |

OSCAR R. VERTIZ, Primary Examiner

G. A. HELLER, Assistant Examiner